United States Patent [19]

Young et al.

[11] 4,456,152

[45] Jun. 26, 1984

[54] MEASURING AND DISPENSING APPARATUS

[76] Inventors: Don H. Young, 2215 N. 38th Way, Phoenix, Ariz. 85008; Austin E. Elmore, 8519 E. Pasadena Ave., Scottsdale, Ariz. 85253

[21] Appl. No.: 374,072

[22] Filed: May 3, 1982

[51] Int. Cl.³ .............................................. G01F 11/06
[52] U.S. Cl. .................................... 222/309; 222/372; 222/383
[58] Field of Search ............... 222/129, 282, 309, 372, 222/386, 387, 425, 434, 43, 47, 49, 50, 383, 380, 384

[56] References Cited

U.S. PATENT DOCUMENTS

| | | | |
|---|---|---|---|
| 1,622,317 | 3/1927 | Irving . | |
| 2,025,821 | 12/1935 | Nordmarken | 221/106 |
| 2,515,735 | 7/1950 | Saunders | 222/430 |
| 3,492,876 | 2/1970 | Bull et al. | 222/309 X |
| 3,838,793 | 10/1974 | Rochette | 222/309 X |
| 4,024,992 | 5/1977 | Schmid | 222/211 |
| 4,084,730 | 4/1978 | Franke et al. | 222/309 |
| 4,096,751 | 6/1978 | Withers et al. | 222/43 |
| 4,199,079 | 4/1980 | Oloff et al. | 222/47 X |
| 4,273,257 | 6/1981 | Smith et al. | 222/309 X |

*Primary Examiner*—Joseph J. Rolla
*Assistant Examiner*—Charles C. Compton
*Attorney, Agent, or Firm*—Warren F. B. Lindsley

[57] ABSTRACT

A hand-held measuring and dispensing device for liquids employing a novel adjustable cam mounted inside of the device which limits the movement of a plunger to control the amount of liquid withdrawn from a reservoir on the device upon one movement of the plunger and discharges a like measured amount from the device upon another movement of the plunger.

8 Claims, 11 Drawing Figures

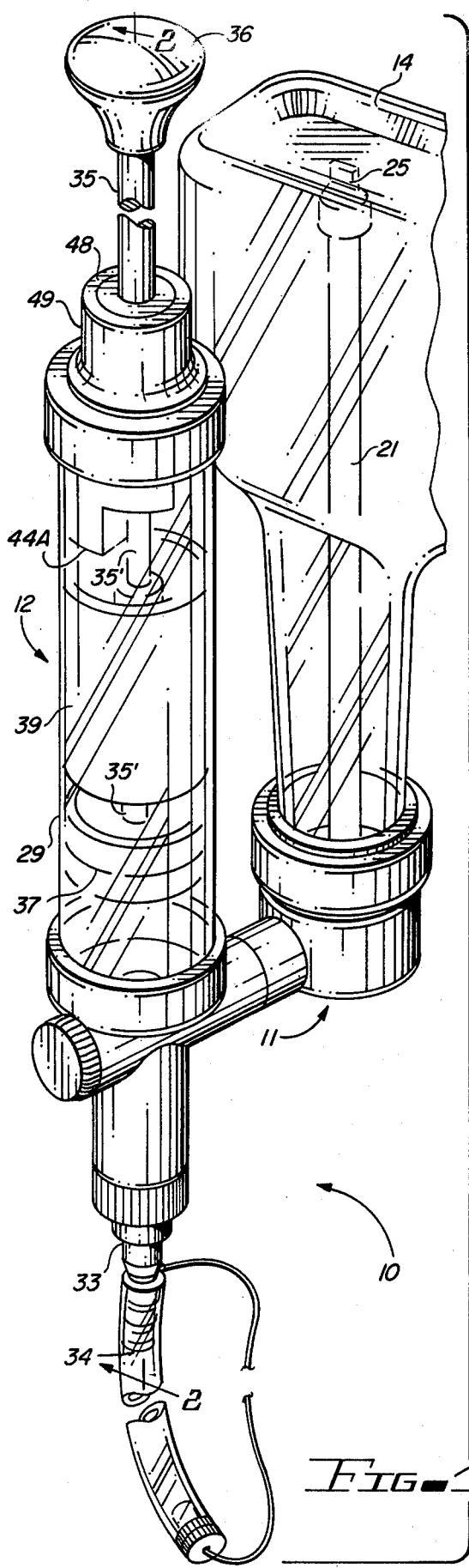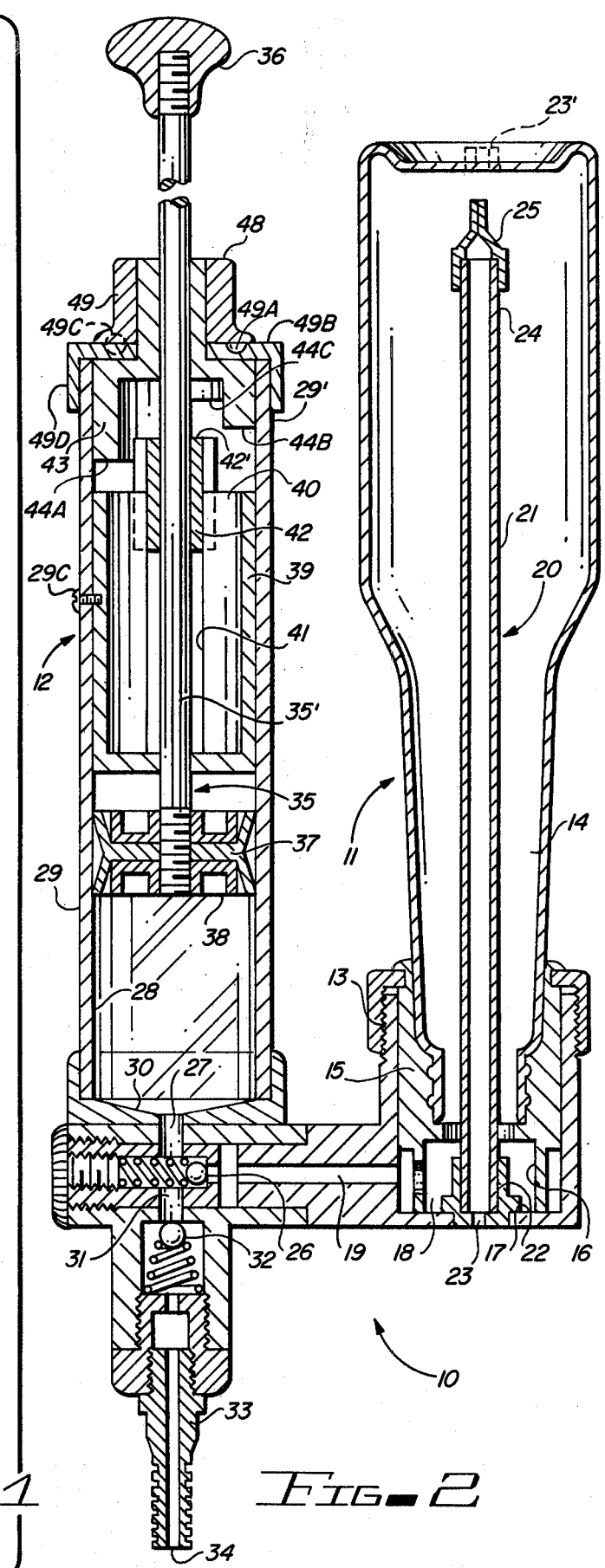

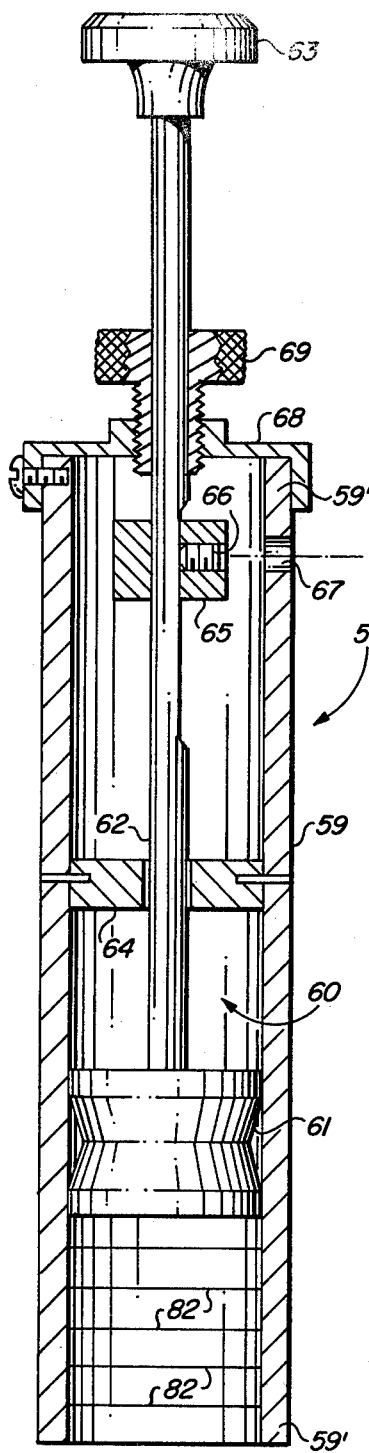
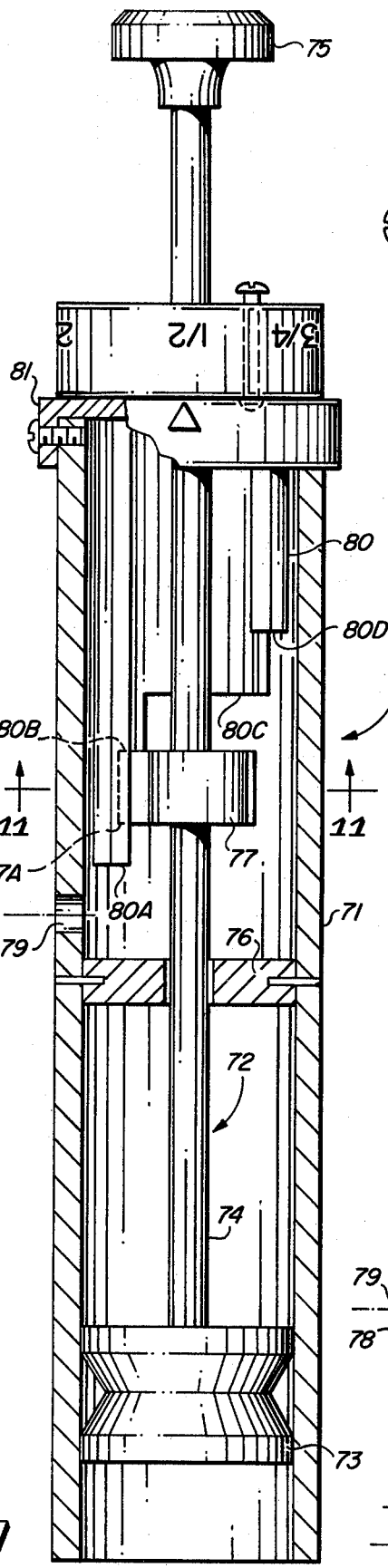
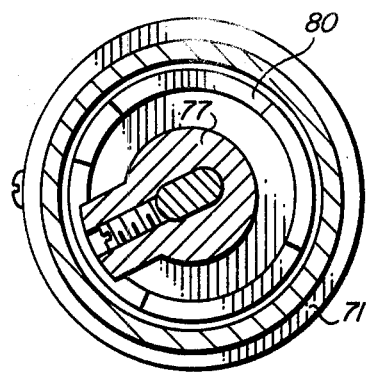

MEASURING AND DISPENSING APPARATUS

BACKGROUND OF THE INVENTION

This invention relates to measuring and dispensing apparatus for liquids and, more particularly, to hand-held apparatus for withdrawing measured quantities from a container and dispensing the measured amount into a receptacle.

DESCRIPTION OF THE PRIOR ART

Measuring and dispensing devices have been known for liquids and granular substances. However, there is still a need for a simple and easily operable hand-held measuring and dispensing device for liquids which withdraws a predetermined amount from a bottle or other suitable container and selectively discharges the exact amount into a receptacle.

U.S. Pat. No. 1,622,317 discloses an automatic measuring device for liquids wherein two different quantities of the liquid may be predetermined by a valving apparatus with either one of the quantities withdrawn at the option of the user.

U.S. Pat. No. 2,025,821 discloses a dispensing device for granular products employing a revolvable measuring device connected to a hopper near its base.

U.S. Pat. No. 2,515,735 discloses a measuring device for granulated material employing a cap for a jar of the material in which a rotatable measuring wheel is arranged for dispensing the material.

None of these structures are simple and reliable enough for quickly dispensing liquids, such as gasoline additives, directly into a fuel tank of a vehicle, among other things.

SUMMARY OF THE INVENTION

In accordance with the invention claimed, a new and improved hand-held measuring and dispensing apparatus is provided which delivers predetermined quantities of liquid from an associated source in a simple and direct manner at the option of the user.

It is, therefore, one object of this invention to provide a hand-held dispensing device that dispenses selected quantities of a liquid from a container mounted on the device, quickly and accurately.

Another object of this invention is to provide a new and improved hand-held liquid dispensing device employing a measuring plunger operable to withdraw a predetermined desired amount of liquid from an attached bottle and selectively discharging the exact amount into a receptacle.

A further object of this invention is to construct a hand-held liquid dispensing device that may be held in one hand and the feed plunger operated or depressed from a preset position with the other hand.

A still further object of this invention is to provide a simple and practical hand-held measuring and dispensing device for liquids which is efficient and reliable in use and relatively inexpensive to manufacture.

Further objects and advantages of the invention will become apparent as the following description proceeds; and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which:

FIG. 1 is a perspective view of a measuring and dispensing device incorporating the features of this invention;

FIG. 2 is a cross-sectional view of FIG. 1 taken along the line 2—2;

FIG. 8 is a cross-sectional view of a further modification of the measuring and dispensing device shown in FIG. 1 employing an adjustable stop;

FIG. 9 is a cross-sectional view of a still further modification of the measuring and dispensing devices shown in FIGS. 1 and 8 wherein the cam follower is adjustably positionable along the plunger rod;

FIG. 10 is an enlarged partial view of the cam follower of FIG. 9 and illustrates the means for adjustably positioning it along the plunger rod; and FIG. 11 is a cross-sectional view of FIG. 9 taken along the line 11—11.

DESCRIPTION OF THE PREFERRED EMBODIMENT

Figure 3:
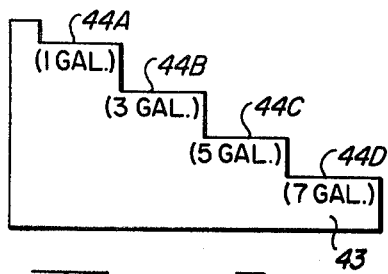
FIG. 3 is a plan view of the cylindrical cam shown in FIGS. 1 and 2.

Referring more particularly to the drawings by characters of reference, FIGS. 1-6 disclose a measuring and dispensing device 10 comprising a body or frame having a supply receptacle support portion 11 and a measuring and dispensing portion 12. The supply receptacle support portion 11 has a threaded bore 13 for receiving the threaded neck of large supply receptacles 14 or an adaptor sleeve 15 to receive a smaller neck receptacle.

The threaded bore 13 communicates with a counterbore 16 having a bottom 17 forming a chamber 18 which is in communication with a passageway 19. An air bleed check valve arrangement 20 comprises an elongated tube 21 fixedly secured at one end in a collar 22 and over an orifice 23 in support portion 11. The elongated tube 21 extends into receptacle 14 and is provided at its other end 24 with an air bleed nipple 25 which allows atmospheric pressure to enter through it into receptacle 14 at its top when the contents of receptacle 14 are discharged through passageway 19 and outwardly of the measuring and dispensing device 10.

In passageway 19 of support portion 11 of the measuring and dispensing device 10, a first check valve 26 is provided which allows the free flow of the contents of receptacle 14 into an intake port 27 which opens into the bottom of bore 28 of the measuring and dispensing cylinder 29 formed on and rigidly connected with the measuring and dispensing device 10. The conical bottom 30 of cylinder 29 tapers inwardly terminating in a discharge nozzle 33 and dispensing orifice 34, the second check valve allowing discharge through the orifice 34 but preventing air flow inwardly from the orifice to the cylinder bore 28. A suitable demountable protective cap (not shown) may be provided over nozzle 33 in a well-known manner.

A measuring and dispensing plunger 35 comprising a rod 35' is longitudinally movable and withdrawable from the bore 28 of cylinder 29 and has a thumb and finger manipulating knob 36 formed on its top. The bottom end of plunger 35 has a piston 37 covered with or formed from a suitable material which slidingly engages with bore 28 and has a bottom surface 38 arranged to engage the bottom 30 of the cylinder 29 when the plunger 35 is pushed fully downwardly into cylinder 29.

In order to control the depth of travel of plunger 35 and the amount of discharged material from nozzle 33, a measuring cylinder 39 open at end 40 is positioned within cylinder 29 at the exposed end 29' thereof. Cylinder 39 is secured to cylinder 29 in any suitable manner and is shown in FIG. 2 of the drawing as being secured by a bolt or screw 29C.

Figure 4:
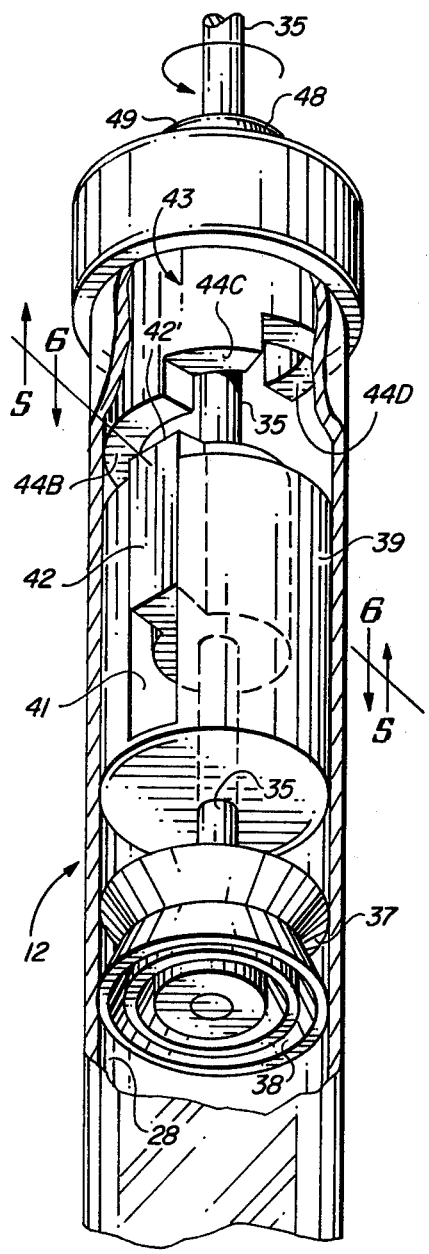
FIG. 4 is an enlarged partial view of FIGS. 1 and 2 illustrating the piston in position for engagement with one of the cam surfaces of the device.

As noted from FIG. 4, cylinder 39 is split along its length to provide a channel 41, forming a path for the movement therein of a piston 42 which is fixedly attached by a set screw to rod 35' of plunger 35. Thus, as plunger 35 is moved longitudinally in bore 28 of cylinder 29, piston 42 moves longitudinally in measuring cylinder 39. Thus, piston 42 is physically restrained in channel 41 of cylinder 39 except for longitudinal sliding movement therealong.

It should be noted that piston 42 is at all times captured within channel 41 and that its movement in the direction of end 29' of cylinder 29 is limited by a rotatably mounted cylindrical cam 43. The exposed end of cam 43 inside cylinder 29 comprises a plurality of steps 44 which control the distance of travel of pistons 37 and 42, depending on the rotational position of cam 43. Cam 43 is fixedly attached to a cap 49 at end 29' of the cylinder and, upon rotation of cap 49, the position of the exposed edge of cam 43 relative to piston 42 may be varied. Detents 49A may be formed in surface 49B of cap 49D for capturing a ball 49C in the usual known manner for selectively controlling the rotational position of cap 49.

FIG. 3 illustrates cam 43 and its exposed edge surface, forming steps 44A–44D, in a planar view wherein the steps determine the amount of fluid, for example, gasoline additive, withdrawn from supply receptacle 14 for addition to one or more gallons of gasoline in the gasoline tank of a vehicle depending on its position relative to piston 42.

Thus, by rotating cap 49, piston 42 in measuring cylinder 39 can be exposed to any selected one of the surfaces 44A–44D of cam 43 so that the longitudinal movement of pistons 37 and 42 can be controlled and, accordingly, the amount of fluid from receptacle 14 withdrawn therefrom into cylinder 29 by the movement of pistons 37 and 42 toward end 29' of cylinder 29.

The limit of travel of pistons 37 and 42 toward end 29' of cylinder 29 is controlled by the engagement of the end 42' of piston 42 with the selected step or surface 44A–44D of cam 43.

It should be noted that cam 43 can be removed and replaced with cams having other configurations for use in dispensing other materials and amounts thereof.

FIG. 4 shows the end 42' of piston 42 close to engagement with a selected one of the steps 44A–44D of cam 43.

Figure 5:
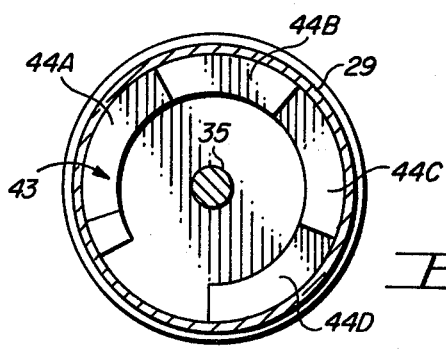
FIG. 5 is a cross-sectional view of FIG. 4 taken along the line 5—5.
Figure 6:
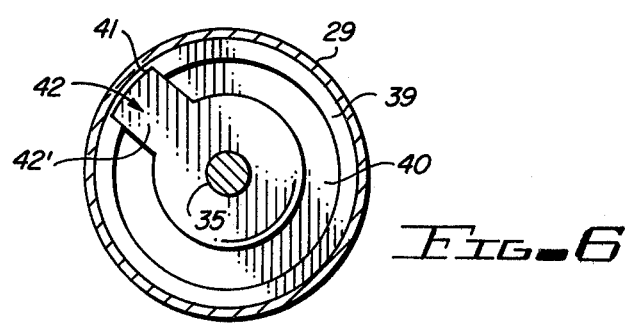
FIG. 6 is a cross-sectional view of FIG. 4 taken along the line 6—6.

FIGS. 5 and 6 illustrate cross-sectional views of FIG. 4 to more clearly illustrate the hardware of the plunger and piston configurations.

As noted from FIGS. 1 and 2 of the drawings, indicia 48 may be added to cap 49 at the exposed end 29' of cylinder 29 to determine the position of cam 43 indicative of a selected amount of dischargeable material from nozzle 33.

It should be noted that check valves 26 and 32 are of the usual ball type which are held in place in the usual manner by predetermined spring pressure in a manner which is believed obvious from FIG. 2 of the drawings.

Figure 7:
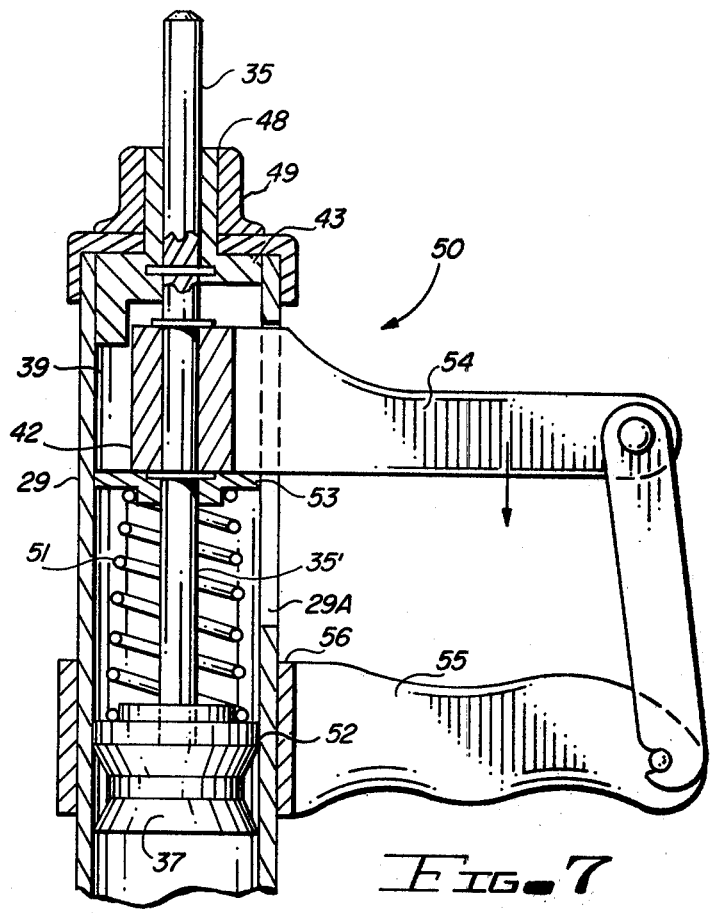
FIG. 7 is a partial view of a modification of the actuating means for the measuring and dispensing device of FIG. 1.

FIG. 7 discloses a partial view of a measuring and dispensing device 50 which is a modification of the measuring and dispensing device 10 of FIG. 1 wherein like parts are given the same reference characters.

The essential difference of device 50 of FIG. 7 from device 10 of FIG. 1 comprises the fact that plunger 35 is biased by a spring 51 toward the dispensing end of the structure, but restrained in its movement by a ledge 52 in bore 28 of cylinder 29. Spring 51 is seated on a collar 53 which is secured to rod 35' inside the cylinder 29.

A pair of hand-gripping handles 54 and 55 are mounted on the outside of cylinder 29 to extend laterally thereof. Handle 54 is secured to rod 35' and arranged to slide longitudinally of cylinder 29 in a slot 29A formed therein longitudinally thereof. Handle 55 is attached to a collar 56 which is secured to cylinder 29. To disperse fluid, the handles 54 and 55 are gripped by a hand of the user moving handle 54 toward handle 55 until the desired charge of material is discharged from cylinder 29. Upon relaxing of handle 55, spring 51 biases the piston toward the cam end of cylinder 29 to load the cylinder with a selected quantity of material.

It should be noted that cam 43 is rotatably mounted in cylinder 29 and operated in the same manner as the device of FIG. 1. Rotation of cap 49 positions cam 43 in a particular arrangement with respect to piston 42 to thereby control the travel of cylinder 29 and piston 42 and, in turn, the amount of material loaded into cylinder 29.

In use, the measuring and dispensing device 10 is turned upside down and the uncapped supply receptacle 14 is screwed into position in the adaptor sleeve 15. The dispensing device 10 is then positioned as shown in FIG. 1 and held in one hand by means of cylinder 29. Plunger 35 is then withdrawn upwardly to draw into bore 28 of cylinder 29 fluid material through port 27 of the desired quantity indicated by indicia 48 on cap 49. Air enters through bleed valve 20 and up into the top of receptacle 14. The discharge nozzle 33 is then placed in the container to receive the fluid material and the plunger 35 pushed toward the nozzle end of the cylinder, thereby discharging an accurately measured amount of material out of the discharge orifice 34 of discharge nozzle 33.

It should be noted from FIG. 2 that a port 23', shown in dash lines, may be formed in the top of supply receptacle 14, thereby obviating the need for the bleed check valve 20. If so desired, the bleed nipple 25 may be attached to port 23' if it extends inwardly of the end of receptacle 14.

The spring actuated plunger of FIG. 7 merely takes the place of the normal action of withdrawing the plunger upwardly into the cylinder 29 to load the cylinder.

FIG. 8 discloses a cross-sectional view of a modification of the measuring and dispensing device shown in FIG. 1 wherein the measuring and dispensing device 58 is connected to the supply receptacle support portion in the same manner as shown in FIG. 1. The measuring and dispensing device 58 comprises an open-ended cylinder 59 having a plunger 60 mounted therein for predetermined reciprocal movement therealong. Plunger 60 comprises a piston 61 mounted at the end of a piston rod 62, the free end of which is provided with a knob 63. The piston rod 62 is guided along cylinder 59 by a bearing structure 64. Graduation markings 82 may be placed on cylinder 59 to indicate the amount of fluid withdrawn from the supply receptacle 14 by movement of plunger 60. If desired, a stop, such as collar or ring 65 mounted on rod 62, as shown in FIG. 8, may be used to predetermine a given movement of plunger 60.

Ring 65 is positioned at a given position along rod 62 by means of a set screw 66 which is loosened or tightened in its relationship to rod 62 by the tip of a screwdriver or Allen wrench (not shown) extending through a hole 67 in cylinder 59, as shown.

Thus, upon movement of rod 62 in cylinder 59, piston 61 is movable in cylinder 59 a distance which is determined by the position of ring 65, or if ring 65 is not used, by graduation lines 82 on the outside of cylinder 59. When rod 62 is pulled out of cylinder 59, i.e., toward the top end 59" of the cylinder, as shown in FIG. 8, ring 65 engages cap 68 on cylinder 59 which forms a stop or limit for the rod's upward movement. Fine adjustment to the amount of movement of rod 62 in cylinder 59 can be accomplished by the threaded movement of the knurled collar 69 which is threadedly mounted in cap 68 and also serves as a further bearing for rod 62.

FIGS. 9 and 10 illustrate a further modification of the measuring and dispensing devices shown in FIGS. 1-8 usable with the receptacle support portion and receptacle of FIGS. 1 and 2 wherein measuring and dispensing device 70 comprises an open-ended cylinder 71 having a plunger 72 mounted therein for predetermined reciprocal movement therealong. Plunger 72 comprises a piston 73 mounted at the end of a piston rod 74, the free end of which is provided with a knob 75. The piston rod 74 is guided along cylinder 71 by a bearing structure 76 arranged in cylinder 71 at a point between its ends.

A cam follower 77 is adjustably positioned at one of a number of positions along the length of piston rod 74 by a set screw 78 loosened or tightened by a screwdriver or Allen wrench extending through a hole 79 in the wall of cylinder 71, as shown in FIG. 10.

Instead of the travel of the piston rod being limited by cap 68 or adjustable collar 69 of the structure shown in FIG. 8, a cam 80 is provided in the device shown in FIGS. 9 and 10.

Cam 80 comprises a member similar to cam 43 of FIG. 3 which is fixedly arranged inside of cylinder 71 at its closed end. When piston rod 74 is moved inwardly of cylinder 71 to a point where a cam follower 77 is adjacent bearing 76, clearing the surface 80A of the cam 80, it may be fixedly attached to piston rod 74. Then, by rotating piston rod 74 and, in turn, cam follower 77 until the desired surface of cam 80, i.e. one of surfaces 80A-80D, is in line with the end 77A of cam follower 77, a preselected quantity of liquid may be withdrawn from receptacle 14 and dispensed from the device. At this point, movement of piston rod 74 with cam follower 77 attached thereto between stop 76 and the selected cam surface (80A-80D) of cam 80 obtains the measuring and dispensing of a given fluid in the manner of device 10 heretofore described.

It should be noted that the measuring and dispensing devices shown in FIGS. 8-11 are utilized with the same or similar support portion, supply receptacle and check valve arrangements shown in FIGS. 1 and 2, but this hardware has been eliminated from these figures for the sake of clarity.

While the apparatus herein disclosed and described constitutes a preferred form of the invention, it is also to be understood that the apparatus is capable of mechanical alterations without departing from the spirit of the invention; and that such mechanical arrangement and commercial adaptations as fall within the scope of the appendant claims are intended to be included herein.

What is claimed is:

1. A measuring and dispensing device comprising:
   a frame,
   a supply receptacle,
   a measuring and dispensing means mounted on said frame,
   said measuring and dispensing means comprising a cylinder and a plunger reciprocally operable in said cylinder,
   a passageway in said frame interconnecting said receptacle and said cylinder,
   a first check valve in said passageway to arrest flow from said cylinder to said receptacle,
   a discharge port in the end of said cylinder,
   a discharge nozzle connected to said port,
   a check valve located between said discharge port and said nozzle to arrest flow from said nozzle into said cylinder, and
   cam means mounted inside of said cylinder for limiting longitudinal movement of said plunger for controlling the amount of material discharged by said plunger through said nozzle,
   said cam means comprising a step configuration with each step forming one of a plurality of cam surfaces, and
   said plunger comprising a piston longitudinally movable within a measuring cylinder mounted within said cylinder for engaging with said cam surfaces.

2. The measuring and dispensing device set forth in claim 1 wherein:
   said cam means comprises a cam mounted in one end of said cylinder, and a cam follower mounted on said plunger for engaging a part of said cam for adjustably limiting its movement.

3. The measuring and dispensing device set forth in claim 2 wherein:
   said plunger is rotatably mounted in said cylinder for positioning said cam follower to engage with a particular part of said cam.

4. The measuring and dispensing device set forth in claim 1 wherein:
   said cam means comprises a cylindrical configuration, the plunger engaging edge of which is provided with a plurality of distinct cam surfaces.

5. The measuring and dispensing device set forth in claim 1 wherein:
   said cam means is rotatably mounted in one end of said cylinder.

6. The measuring and dispensing device set forth in claim 1 wherein:
   said measuring cylinder is slotted along its length for guiding said piston longitudinally thereof.

7. The measuring and dispensing device set forth in claim 1, in further combination with:

an air bleed valve located in said receptacle for causing atmospheric pressure to enter said supply receptacle.

8. The measuring and dispensing device set forth in claim 1 wherein:
said cam means comprises a stop mounted on said plunger for engaging said cylinder for controlling the amount of movement of said plunger.

* * * * *